No. 711,934. Patented Oct. 28, 1902.
C. L. BOND.
AUTOMATIC WEIGHING SCALE.
(Application filed Mar. 18, 1902.)
(No Model.)

WITNESSES
Chas. L. Hyde
M. C. Nickerson

INVENTOR
Charles L. Bond
BY Hazard & Harpham
ATTORNEYS.

UNITED STATES PATENT OFFICE.

CHARLES L. BOND, OF LOS ANGELES, CALIFORNIA.

AUTOMATIC WEIGHING-SCALE.

SPECIFICATION forming part of Letters Patent No. 711,934, dated October 28, 1902.

Application filed March 18, 1902. Serial No. 98,817. (No model.)

*To all whom it may concern:*

Be it known that I, CHARLES L. BOND, a citizen of the United States, residing at Los Angeles, in the county of Los Angeles and the State of California, have invented new and useful Improvements in Automatic Weighing-Scales, of which the following is a specification.

My invention relates to scales for weighing predetermined quantities of any substance; and the object thereof is to provide a scale which will weigh any given quantity and will automatically cut off the supply of such material when the given quantity has left the supply-hopper. I accomplish this object by the devices described herein and illustrated in the accompanying drawings, forming a part hereof, in which—

Figure 1:
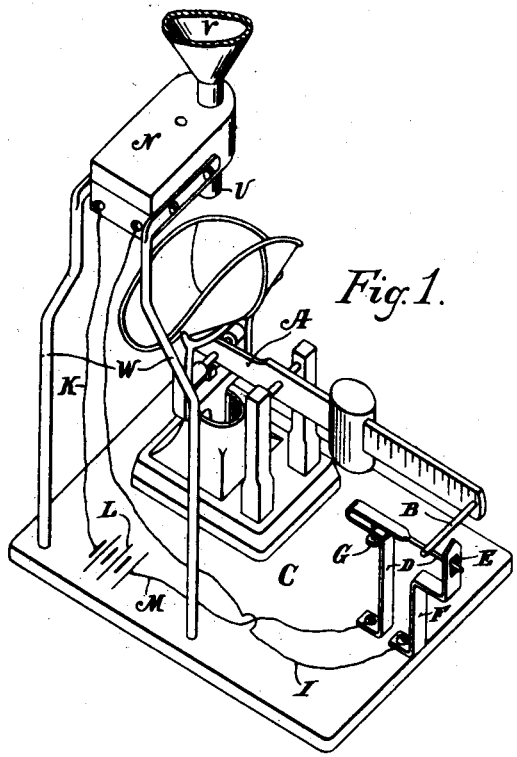
Figure 2:
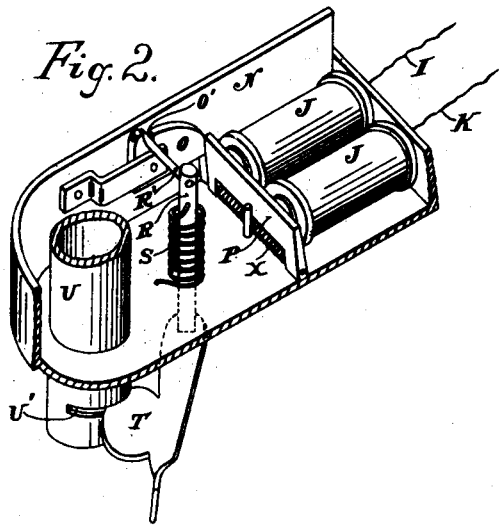

Figure 1 is a perspective view of my scale and the connected mechanism, a part of the supply-hopper being broken away. Fig. 2 is a perspective view, partly broken away, of the cut-off mechanism.

In the drawings, A represents any merchandise-scale of ordinary mechanism, except that the beam is provided with a projecting depression-rod B in the free or outer end thereof. This scale is affixed to a base-plate C, of non-conducting material, on which is affixed the contact-spring D, the free end of which passes through aperture E in contact-standard F. The top portion of this spring is preferably parallel with the base-plate and is bent back so that a portion of the lower portion is parallel with the upper portion. In one portion of that part of the spring in which the parts are parallel a thumb-screw G passes therethrough in a threaded hole. The end of this screw is adapted to be screwed against the other part to give an upward pressure on the depression-rod equal to the weight of the material between the scale and the supply-hopper when the supply of material is cut off therefrom, as hereinafter explained. The contact-standard is affixed to the base-plate and is electrically connected by wire I with one pole of electromagnets J of the automatic cut-off device. The other pole of the electromagnets is electrically connected by wire K with one pole of battery L. The other pole of the battery is electrically connected by wire M with the contact-spring. The electromagnets are mounted in a case N, to which is pivotally attached latch O, the free end of which is adapted to rest on the armature P of the electromagnets when they are not energized. In the top of the latch is a notch O' for the reception and retention therein when the end of the latch is resting on the armature of arm R' of the cut-off shaft R, which is operated by spring S, one end of which is affixed thereto and the other end to the case N. Shaft R is rotatively mounted in the case N and extends trough the bottom thereof and has affixed thereto the cut-off blade T, which is adapted when the arm of the cut-off shaft is released from the latch to enter slot U' in delivery-tube U and close the opening therethrough. The delivery-tube preferably passes through the case N and has affixed thereto or connected therewith supply-hopper V, which holds the material to be weighed. Case N is held a suitable distance above the scales by supporting-rods W, affixed thereto and to the base-plate, so that the delivery-tube is located above the hopper of the scale.

If desired, a platform may be used on the scale instead of the hopper, and the material to be weighed may be delivered directly into a bag placed on the platform for its reception.

Suppose that a grocer desires to put up pound packages of coffee. He places the counterpoise-weight of the scale-beam at the pound-notch, as with the ordinary scale, which causes the unweighted end of the contact-bar to be depressed, so that it will not touch the contact-standard. He then fills the supply-hopper V with coffee, which runs through the delivery-tube and into the hopper of the scale. As soon as a pound of coffee rests on the scale-hopper the free end of the beam rises and the weighted end of the contact-bar brings the other end thereof into touch with the contact-standard, which closes the circuit and energizes the electromagnets, which draw their armature from under the end of latch O, the free end of which falls, thereby releasing the arm of the cut-off shaft. Spring S causes the rotation of the shaft to pass cut-off blade T across the delivery-tube and stop the flow therethrough of the coffee. As soon as all the coffee is in the scale-hopper he finds that he has seventeen ounces.

He then rotates the thumb-screw in the contact-spring to give an upward pressure on the part which passes through the contact-standard equal to one ounce. Thereafter the delivery-tube will be automatically closed whenever sixteen ounces of coffee are in the scale-hopper and between it and the cut-off blade. Any other quantity or substance can be weighed in like manner.

The thumb-screw in the contact-spring enables the operator to counterbalance the material falling into the hopper after the cut-off blade closes the delivery-tube. When the material is removed from the hopper of the scale, the depression-bar again moves the contact-spring from touch with the contact-standard, which breaks the circuit. The cut-off blade is then drawn out of the delivery by hand, the projecting end being provided for that purpose. As the cut-off blade is affixed to the spring-operated shaft R, its withdrawal from the delivery-tube will partly rotate shaft R. This partial rotation will cause arm R' to catch in notch O' of the latch and raise it high enough for spring X to bring armature P under the end of the latch, which then holds the latch in position to hold arm R' against movement until the magnets are again energized and draw the armature from beneath the end of the latch, thereby permitting of the movement of arm R', which permits the cut-off blade to close the delivery-tube, which occurs as soon as the requisite weight of coffee is in the hopper, thereby closing the circuit.

Having described my invention, what I claim as new, and desire to secure by Letters Patent, is—

1. In a weighing-scale, an automatic delivery cut-off comprising a delivery-tube; a spring-actuated cut-off adapted to control the passage of material through said tube; a latch adapted to control said spring-actuated cut-off; and means to control said latch comprising an armature, electromagnets electrically connected to a battery and to a contact maker and breaker, said contact maker and breaker comprising a contact-spring electrically connected to said battery, said contact-spring having its free end passing through an aperture in the contact-standard and having in a portion of its length parts which lie in planes which are parallel; a thumb-screw passing in threaded contact through one portion of said parallel portion and adapted to put a pressure on the end of said spring which passes through the contact-standard, and a contact-standard having an aperture therethrough, said standard being electrically connected to said electromagnets.

2. The combination of a scale adapted to support and weigh a given quantity of any substance, with a delivery adapted to deliver such substance on the scale, said delivery having thereon a cut-off mechanism adapted to cut off the substance being weighed when any predetermined quantity of such substance is upon the scale; said cut-off mechanism comprising a spring-actuated cut-off blade; a latch adapted to hold said cut-off blade normally open to permit the material to pass to the scale; an armature adapted to retain the latch in position to hold the cut-off blade open, electromagnets electrically connected with a battery and with a circuit maker and breaker; a circuit maker and breaker electrically connected to said battery; said circuit maker and breaker comprising a contact-spring and a contact-standard, adapted to stand normally out of contact; a depression-rod affixed to the scale-beam adapted to bear upon the contact-spring and hold it out of contact with the contact-standard until the predetermined quantity of the given substance is on the scale; said contact-spring having parallel portions with a thumb-screw passing in threaded contact through one of the parallel members and adapted to be screwed against the other portion and increase the tension thereof.

In witness that I claim the foregoing I have hereunto subscribed my name this 12th day of March, 1902.

CHAS. L. BOND.

Witnesses:
   G. E. HARPHAM,
   HENRY T. HAZARD.